United States Patent [19]
Julyan et al.

[11] Patent Number: 5,974,097
[45] Date of Patent: Oct. 26, 1999

[54] METHOD AND APPARATUS FOR RECEIVING A DATA SIGNAL AND A DIGITAL FILTER CIRCUIT

[75] Inventors: Jason B. E. Julyan, Bedford, United Kingdom; Stephen J. Hubbins, Houston, Tex.

[73] Assignee: Texas Instruments Incorporated, Dallas, Tex.

[21] Appl. No.: 08/872,457

[22] Filed: Jun. 10, 1997

Related U.S. Application Data

[63] Continuation of application No. 08/395,356, Feb. 27, 1995, abandoned.

[30] Foreign Application Priority Data

Feb. 25, 1994 [GB] United Kingdom .................... 9403724

[51] Int. Cl.⁶ ................................................ H04L 27/06
[52] U.S. Cl. ......................... 375/340; 375/350; 375/355; 375/372; 375/342
[58] Field of Search ..................................... 375/355, 371, 375/360, 361, 340, 350, 368, 372, 342

[56] References Cited

U.S. PATENT DOCUMENTS

| | | | |
|---|---|---|---|
| 4,821,297 | 4/1989 | Bergmann et al. | 375/376 |
| 5,341,404 | 8/1994 | Sevenhans et al. | 375/342 |

FOREIGN PATENT DOCUMENTS

| | | | |
|---|---|---|---|
| 0 384 536 | 8/1990 | European Pat. Off. | H04L 7/33 |
| 0 508 885 A2 | 10/1992 | European Pat. Off. | H04L 7/33 |
| 0 551 695 A1 | 7/1993 | European Pat. Off. | H04L 7/33 |

*Primary Examiner*—Don N. Vo
*Attorney, Agent, or Firm*—Gerald E. Laws; William B. Kempler; Richard L. Donaldson

[57] ABSTRACT

A method and apparatus for receiving an input digital data signal representing a sequence of values in which samples of the waveform of the data signal are taken a plurality of times during each of the values. A plurality of the samples are stored as they are received, in a known order in locations at a sequence of addresses in a memory. A digital signal representing the difference in phase between the input data signal and a reference signal is derived. The digital phase signal is decoded and the location at the address of the memory represented by the digital phase signal is accessed so as to select samples remote from edges in the waveform of the input data signal.

26 Claims, 4 Drawing Sheets

METHOD AND APPARATUS FOR RECEIVING A DATA SIGNAL AND A DIGITAL FILTER CIRCUIT

This application is a Continuation of application Ser. No. 08/395,356, filed Feb. 27, 1995 now abandoned.

This invention relates to receiving data signals and to digital filter circuits that are of use especially in the receiving of data signals.

One application where data signals have to be received is computer networks, for example, token ring networks. In one token ring network, it is required to receive packets of data which are up to 18 kbit in length. Even if they are transmitted at a constant rate, the symbols used to represent the data on a communications channel do not arrive at the receiver at a constant rate. This effect is known as jitter. One of the sources of jitter is that different symbols can have different frequencies in their spectra and so might travel along the channel at different speeds.

In network interfaces, the conventional method used to cope with jitter is for the receiver to employ an analogue phase locked loop to maintain a clock signal in a particular phase relationship with the symbols of the incoming data signal. That clock signal is then used to actuate a latch to read the data from the data signal.

An analogue phase locked loop usually comprises a voltage-controlled oscillator providing the clock signal, a phase comparator providing an indication of the difference in phase between the clock signal and the data signal, and a loop filter responsive to that controlling the voltage supplied to the oscillator.

The present invention provides a method of receiving an input digital data signal representing a sequence of values, comprising: taking samples of the waveform of the data signal a plurality of times during each of the values, storing in a known order in locations at a sequence of addresses in a memory a plurality of the samples as they are received, deriving a digital signal representing the difference in phase between the input data signal and a reference signal, and decoding the digital phase signal and accessing the location at the address of the memory represented by the digital phase signal so as to select samples remote from edges in the waveform of the input data signal.

The invention directly selects, in response to the phase signal, among samples that have already been taken. This is in contrast to the conventional analogue phase locked loop solution in which a clock signal is generated by the phase locked loop and that clock signal is then used to actuate a latch to sample the data signal being received.

The digital phase signal may be derived from the samples of the data signal, which may be the stored samples.

The digital phase signal may be filtered before being used in the selection of the samples.

The samples may taken by a plurality of sampling means operating in sequence.

The digital phase signal may be derived by detecting and encoding the locations of the stored samples of the data signal that represent edges.

That detection of the position of an edge may comprise combining pairs of the stored samples to give a result for each so combined pair dependent on whether the samples of that pair are the same or different.

The stored samples may be made available in parallel sets. The detection of position of an edge may comprise selecting one of the pairs of a set that has samples that differ. The encoded values of edge position may also include indications of the set of samples in which the detected edges occurred. The sets may be grouped into pairs and the indication may indicate in which of a pair the detected edge position falls. The indication may be used to select a sample at the same position in the other of the two consecutive sets of samples from the one in which the edge occurred.

A set of parallel samples may include one or more of the samples of the previous set.

The method may further comprise: storing the selected samples in a first-in-first-out memory, providing a plurality of clock signals of the same frequency and differing phases, selecting, from time to time, in response to the digital phase signal or another digital phase signal derived in a similar manner, one of the plurality of clock signals, and reading each selected sample from the first-in-first-out memory at times determined by the selected clock signal.

The phase signal may be filtered before being used to select samples and be filtered again before being used to select the clock signal. The same circuitry may be used on a time division basis to perform the two filtering operations.

The present invention also provides apparatus for receiving an input digital data signal representing a sequence of values, comprising: means for taking samples of the waveform of the data signal a plurality of times during each of the values, a first memory for storing in a known order in locations at a sequence of addresses a plurality of the samples as they are received, a phase detector for deriving a digital signal representing the difference in phase between the input data signal and a reference signal, and means for decoding the digital phase signal and accessing the location at the address of the memory represented by the decoded digital phase signal so as to select samples remote from edges in the waveform of the input data signal.

The apparatus may comprise a digital filter connected to filter the digital phase signal before it is used in the selection of the samples.

The means for sampling may comprise a plurality of sampling circuits, the sampling circuits of the plurality being connected to operate in sequence each to sample the waveform of the input digital data signal.

The phase detector may comprises means for detecting and encoding the locations of the samples in the memory that represent edges. That means may comprise a plurality of combining means each for combining a pair of the samples in the memory to give a result dependent on whether the samples of that pair are the same or different.

The phase detector may comprise encoding means responsive to the outputs of the combining means to encode as the digital phase signal the position of one of the combining means indicating a difference between the samples of its pair. The encoding means may be responsive to a counter to encode in the digital phase signal the value in the counter when the phase detector detects an edge.

The means for decoding the digital phase signal and accessing the selected samples may comprise a selector responsive to the encoded value of the counter to cause the memory to be read when it contains the selected sample.

The memory may have a location to latch a sample already in another location of the memory.

The apparatus may further comprise: a first-in-first-out memory connected to latch the selected samples from the first memory, means for providing a plurality of clock signals of the same frequency and differing phases, and a multiplexer responsive to the digital phase signal or another digital phase signal derived in a similar manner to transmit a selected one of the plurality of clock signals, the first-in-first-out memory being responsive to the transmitted clock signal to read out the selected samples.

The apparatus may comprise a digital filter connected to filter the phase signal applied to the multiplexer.

The apparatus may comprise a clock dividing counter connected to divide the transmitted clock signal before it is applied to the first-in-first-out memory.

The means for providing a plurality of clock signals may comprise a master oscillator and an analogue delay locked loop comprising a plurality of delay stages connected in a loop synchronised to it.

The means for decoding the digital phase signal and accessing the selected samples may comprise a multiplexer responsive to the digital phase signal to transmit the value in the selected address of the first memory.

The present invention further provides a digital filter circuit comprising: a first input for samples of a digital signal, a subtractor, an adder and a first clocked register connected in series, the first input of the circuit being connected to the minuend input of the subtractor and the output of the first clocked register being connected to the subtrahend input of the subtractor, a second clocked register connected in series at a position between the output of the subtractor and a first input of the adder to store the difference from the subtractor or a value proportional to it, and a third clocked register connected to latch the value in the first clocked register and supply it as a second input to the adder, the filtered output being taken from the first or third register.

The circuit may comprise a scaler connected in series between the output of the subtractor and the first input of the adder.

The scaler may operate by shifting the digits of its input to positions of less significance.

The circuit may have a second input for samples of a digital signal and a multiplexer connected to supply alternately to the subtractor samples from the first circuit input and samples from the second circuit input.

The second circuit input may be connected to the output of the second clocked register, thereby forming two digital filter circuits in series sharing, in a time division manner, the components of the circuit.

The circuit may comprise a scaler connected in series at a position between the output of subtractor and the input of the adder, and the multiplying factor of the scaler may be switchable to alternate between first and second values for providing different filter characteristics.

One or more of the filter circuits may be used in the apparatus of the present invention or in a circuit for performing the method of the present invention.

The present invention may be used in the receiving of a data signal present on a communications channel which may be that of a computer network.

The present invention further provides a circuit for performing a method of selecting in general a sample from each interval of the waveform of a digital data signal having edges that may occur at positions at the ends of the intervals, by sampling the waveform, dividing the samples into frames equal in length to half the length of the interval and selecting from each pair of frames a sample at the same position in the other frame of the pair from that indicated by a value derived from the position of detected edges, the circuit comprising means for correcting an error of selecting no sample from an interval, comprising: means for indicating whether the value for the current pair of frames indicates a position in the later half of the first frame of that pair and the value for the previous pair of frames indicates a position in the earlier half of the second frame of that pair, and means responsive to that indication for causing a sample at the early end of the first frame of the current pair to be selected.

The present invention additionally provides a circuit for performing a method of selecting in general a sample from each interval of the waveform of a digital data signal having edges that may occur at positions at the ends of the intervals, by sampling the waveform, dividing the samples into frames equal in length to half the length of the interval and selecting from each pair of frames a sample at the same position in the other frame of the pair from that indicated by a value derived from the position of detected edges, the circuit comprising means for correcting an error of selecting two samples from an interval, comprising: means for indicating whether the value for the current pair of frames indicates a position in the earlier half of the second frame of that pair and the value for the previous pair of frames indicates a position in the later half of the first frame of that pair, and means responsive to that indication for preventing the selection of a sample at the early end of the first frame of the current pair that would otherwise have been selected.

There will now be described in greater detail, by way of example only, a circuit for receiving a data signal and a digital filter circuit that may be used therein, with reference to the accompanying drawings of which.

Figure 1:
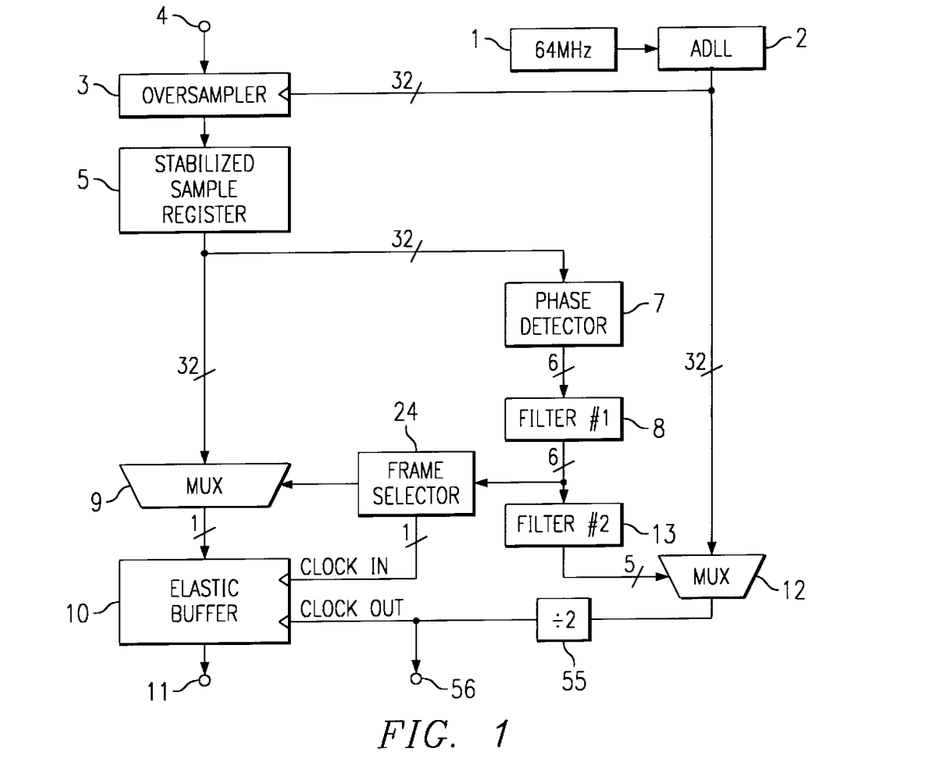
FIG. 1 is a block diagram of a circuit for receiving a data signal.

Referring now to FIG. 1, there is shown a block diagram of a circuit for receiving a serial data signal. The circuit comprises an oscillator 1 and an analogue delay locked loop 2 for providing a plurality of clock signals to operate the circuit. The circuit has an oversampler 3 connected to receive the serial data signal present at an input terminal 4 to the circuit. A stabilised sample register 5 is connected to receive samples from the oversampler 3, and a phase detector 7 receives, in parallel, samples stored in the stabilised sample register 5. The output of the phase detector 7 is applied to a first digital filter 8. A frame selector 24 and a second digital filter 13 both receive the output of the first digital filter 8. A multiplexer 9 receives, in parallel, samples from the stabilised sample register 5 and passes on a selected one of those samples to an elastic buffer 10, the multiplexer 9 being controlled by an input from the frame selector 24. The elastic buffer 10 is connected to receive an output of the frame selector 24 as its input clock. A further multiplexer 12 is controlled by the output of the second digital filter 13, and receives, in parallel, the clock signals from the analogue delay locked loop 2 and passes on a selected one of those signals to the clock input of a divide-by-two counter 55. The output of the divide-by-two counter 55 provides the output clock of the elastic buffer 10. The circuit has two output terminals 11,56 connected to the output of the elastic buffer and the output of the divide-by-two counter 55 respectively.

Briefly, the operation of the circuit is as follows.

The clock signals for the circuit are supplied by the oscillator 1 which supplies a 64 MHz signal to the analogue delay locked loop 2 which provides thirty two clock signals, each having a frequency of 64 MHz. Taken in a particular order each clock signal differs in phase from the next by 11.25°. Most of the logic of the circuit is actuated by a particular one of the thirty two clock signals, termed the system clock. For the sake of clarity, FIG. 1 shows only the connection of all thirty two clock signals to the oversampler 3 and the multiplexer 12, the remaining clock signal connections being omitted.

The input data signal applied to the terminal 4 is supplied to the oversampler 3 which uses the thirty two clock signals to sample the data signal at a rate of 128 samples per bit of the data signal; consecutive groups of thirty two samples derived by the oversampler 3 are latched into the stabilised sample register 5. The samples are one bit values, the value depending on whether the data signal is above or below a threshold level. The stabilised sample register 5 comprises thirty two one bit latches, which operate together in response to the system clock to present each group of thirty two bits as a parallel sample frame.

The phase detector 7, the first digital filter 8 and the frame selector 24 process the frames and select samples therefrom which are remote from where the edges of the data signal occur. The output of the first digital filter 8 indicates the position of a selected sample within the stabilised sample register. The value of that output is used to so operate the multiplexer 9, connected to receive the sample frame, that it transmits the selected sample which is then latched into the elastic buffer 10. The frame selector 24 provides a control signal as the input clock of the elastic buffer so that the elastic buffer only takes a sample from the multiplexer 9 when there is a selected sample in the stabilised sample register 5.

The selected samples are then read out of the elastic buffer 10 in a first-in-first-out manner and are supplied to the terminal 11. From there the selected samples may be processed further. The waveform of the output of the elastic buffer 10 is a reconstructed form of the data signal applied to the terminal 4. That reconstructed waveform may be retransmitted as would be done at a node of a taken ring network. The clock signal applied as the output clock of the elastic buffer 10, for the purpose of reading the selected samples therefrom, is produced by the multiplexer 12 and the divide-by-two counter 55 from the thirty two clock signals. The multiplexer 12 is actuated to select a clock signal by the output of the second digital filter 13. The clock signal so produced is also used to actuate the further processing of the selected samples once they are read out of the elastic buffer 10. The operation of the second digital filter 13 and the multiplexer 12 are described in detail below.

Figure 2:
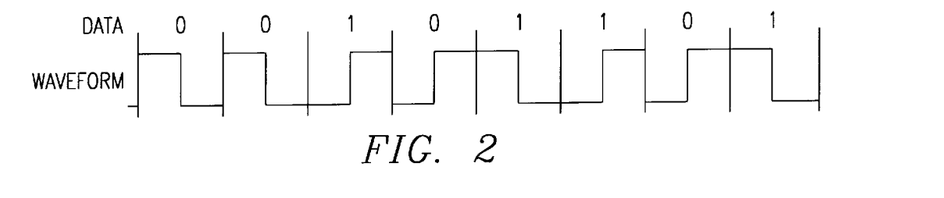
FIG. 2 illustrates a differential Manchester coding scheme.

In this example the data signal has a rate of 16 Mbit per second and the data is coded according to a differential Manchester coding scheme. In that scheme, which is illustrated in FIG. 2, each symbol representing a bit has an edge half way through the symbol; if the symbol represents a "0", the symbol starts with an edge but if it represents a "1" then there is no such edge and the symbol starts at the level at which the preceding symbol finished. Therefore the sense of the edge in the middle of the symbol is in the same sense as the edge in the middle of the previous symbol in the case of an "0" and in the opposite sense in the case of a "1". The circuit of FIG. 1 operates to select one sample from approximately the midpoint of each half of each of the symbols of the data signal (¼ and ¾ of the way through each symbol). The sequence of samples produced from the elastic buffer contains enough information to determine which pairs of samples correspond to each symbol of the data signal and to recover from those pairs the data represented by the data signal.

The operation of the circuit of FIG. 1 is now described in greater detail.

Figure 3:
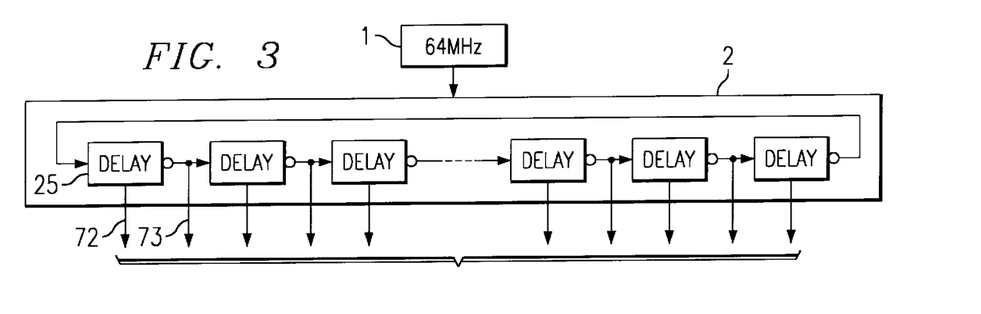
FIG. 3 shows an analogue delay locked loop.

FIG. 3 shows in detail the analogue delay locked loop 2, which comprises seventeen analogue inverting delay stages 25 arranged in a ring. A pulse, consisting of a positive going edge and a negative going edge, propagates around the ring once every cycle of the 64 MHz clock 1 to which it is synchronised. Sixteen of the delay stages 25 each produce two 64 MHz clock signals 72,73, one being an inverted version of the other. The seventeenth stage inverts a positive going edge into a negative going edge and feeds it back to the first stage.

Figure 4:
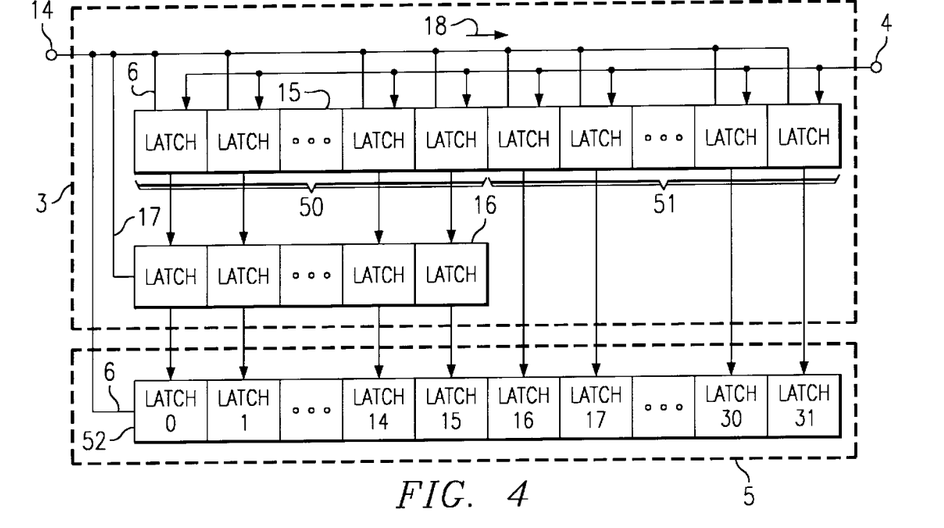
FIG. 4 shows an oversampler and a stabilised sample register and their interconnection.

FIG. 4 shows in more detail the construction of the oversampler indicated generally by the reference numeral 3 and the stabilised data register indicated generally by the reference numeral 5. The oversampler 3 comprises thirty two sampling latches 15 and sixteen buffer latches 16. Each sampling latch 15 is connected to latch the data signal present on the terminal 4 under the control of a respective one of the thirty two clock signals 14. The sampling latches 15 therefore sample the data signal in turn. As indicated by the arrow 18, sampling takes place beginning with the latch at the left hand end and proceeding to the latch at the right hand end. Next thereafter the latch at the left hand end samples again one period of its clock signal later than the previous time it sampled. Therefore, a total of $2048 \times 10^6$ samples per second are taken.

The outputs of a first set 50 of sixteen consecutive sampling latches 15 are respectively connected to the inputs of the sixteen buffer latches 16. The stabilised sampling register 5 comprises thirty two latches 52. The outputs of the buffer latches 16 are respectively connected to the inputs of sixteen of the latches 52 of the stabilised sample register 5. The outputs of the remaining sixteen sampling latches 15, the second set 51 of latches, are respectively connected to the inputs of the remaining sixteen of the latches 52 of the stabilised sample register 5.

The frames of thirty two consecutive samples are latched into the stabilised sample register 5 as follows. When the second set 51 of sampling latches 15 is sampling the data signal, the buffer latches 16 are operated together under the control of an appropriate one of the clock signals on a conductor 17 to latch the samples in the sampling latches of the first set 50. When the first set 50 of sampling latches 15 is sampling the data signal, the latches 52 of the stabilised sample register 5 are operated together under the control of the system clock on conductor 6 to latch the samples in the second set 51 of sampling latches 15 and the samples from the first set 50 stored in the buffer latches 16 at that time.

The choice of which of the thirty two clock signals is taken as the system clock, the clock signal that actuates the stabilised sample register 5, is such that the values of the samples in the second set 51 of sampling latches 15 are fully established before they are latched into the stabilised sample register 5. Preferably the transfer should not be delayed unnecessarily. In practice it has been found that the samples in the second set of sampling latches are all ready as early as when the clock of the leftmost sampling latch 15 in FIG. 4, which takes the earliest sample in a frame, causes that sampling latch to latch. Therefore that clock signal can be and is used as the system clock.

As indicated by the arrow 18 in FIG. 4, sampling takes place from left to right. In the Figure, the latches 52 of the stabilised data register 5 are numbered and the numbers are written inside the boxes representing those latches with 0 in the latch holding the earliest sample of a frame, at the left end, and 31 in the latch holding the latest sample of a frame, at the right.

Figure 5:
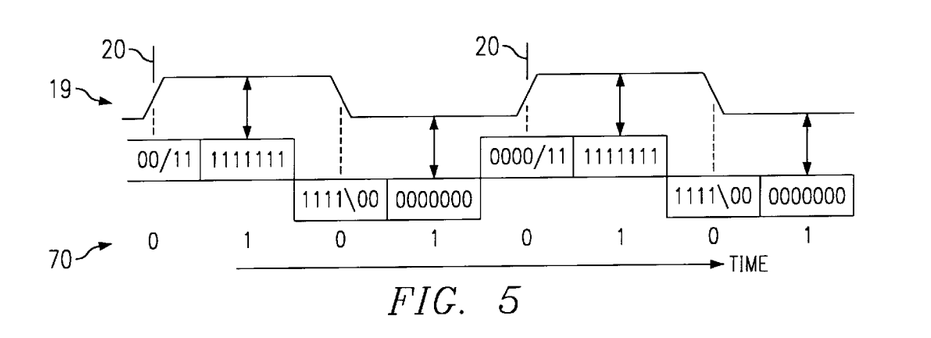
FIG. 5 illustrates the relationship between the frames of samples presented in the stabilised data register and the data signal.

FIG. 5 illustrates the relationship between the frames of samples presented in the stabilised data register 5 and the data signal applied to the terminal 4. Since sampling takes place at a rate of 128 samples per symbol of the data waveform, there are four frames of thirty two samples per symbol presented in turn by the stabilised sample register 5. The waveform 19 of the data signal shown is that representing a series of "0"s, according to the differential Manchester coding scheme outlined above, which has the maximum possible number of edges, one every 64 samples. The vertical lines 20 mark the divisions between symbols. Below the waveform 19 are shown the values of the samples of the waveform. The boxes around the samples mark the frames of samples presented in the stabilised data register 5. For convenience only some of the samples in each frame are shown. The samples marked "\" and "/" are those near the edges in the data signal, whose values are unreliable. The frames are grouped into pairs as is indicated by the way the frames are staggered. Each pair of frames has, in the case of the waveform 19 illustrated, one edge.

The edges of the waveform 19 illustrated fall at roughly the same position in alternate frames. The edges are not always at exactly the same position due to the problems of jitter, and also unreliable sampling near the edges of the data signal can result in the edge appearing at an incorrect position in the stabilised sample register close to the true position. From the Figure it can be seen that reliable samples can be obtained from the midpoints of both halves of each symbol by noting the position of each edge in its frame and selecting the sample at the same position in the other frame of the pair of frames in which the edge occurs. This in essence is the method employed by the receiving circuit of FIG. 1.

Data signals represent, of course, "1"s as well as "0"s. When a "1" occurs the differential Manchester coded data signal will lack an edge at the beginning of the symbol. In that case a pair of frames will lack an edge. Since, however each symbol has an edge at its midpoint, there will be an edge in the pair of frames preceding a pair without an edge. The difficulty of missing edges is overcome for by using as the edge position for that pair of frames the position used for the previous pair having an edge.

Figure 6:
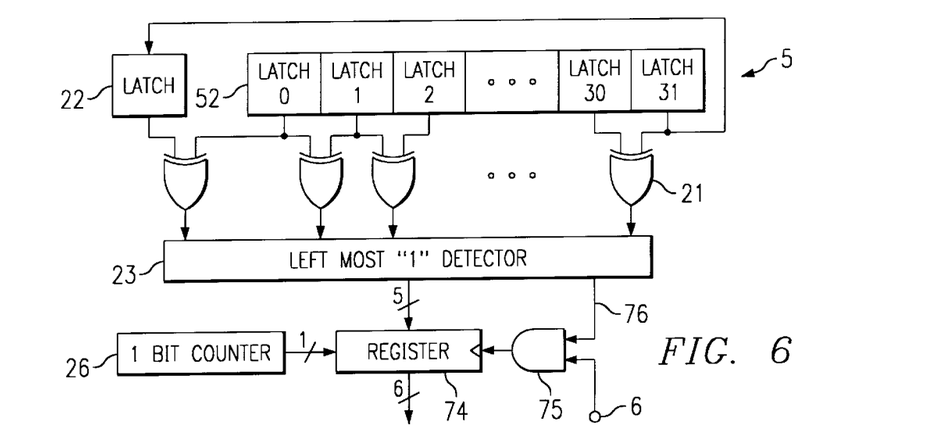
FIG. 6 shows part of the circuitry of the phase detector and its connection to the stabilised sample register.

FIG. 6 shows the circuitry of the phase detector 7 and its connection to the stabilised sample register 5. Neighbouring latches 52 of the stabilised data register 5 are combined with XOR gates 21 to give "1"s at those positions where the value in a latch 52 differs from that in its neighbour. The earliest sample in a frame is combined with the latest from the previous frame which is preserved for the purpose in a latch 22. The outputs of the XOR gates 21 are therefore "1" where there are edges in the data signal and "0" elsewhere. If there is an edge in the frame there will usually be a single "1" in the outputs of the XOR gates although, if the edge is noisy, a group of three "1"s can occur if the values in the stabilised sample register change, for example, from "1" to "0" and then back to "1" before finally settling at "0". The position of the edge in the stabilised data register 5 is encoded by a leftmost "1" detector 23 which is connected to receive the outputs of the XOR gates 21. If the outputs of the XOR gates 21 are taken in order to represent a thirty two bit number, the output of the leftmost "1" detector is a five bit number giving the position of the leftmost or most significant "1" in that number. The circuitry and operation of the leftmost "1" detector are described in EP-A-0 543 517.

As mentioned above, the edges of the data signal occur at most in every other frame. The frames are numbered alternately "0" and "1". A one bit counter 26 responsive to the system clock is used to provide the numbers which are illustrated in FIG. 5 at 70. The phase detector 7 has a register 74 which latches the output of the leftmost "1" detector 23 and the output of the one bit counter 26, and presents, in every other system clock cycle a six bit value representing the position of the edge, if any, in the last pair of frames. The register 74 latches in response to the output of an AND gate 75 which combines the system clock 6 with an output 76 of the leftmost "1" detector 23 indicating when an edge has been found. The six bit value comprises, as the five bits of lowest significance, the five bit output of the leftmost "1" detector 23 that the edge caused and, as the most significant bit, the value of the one-bit counter 26 for the frame in which it occurred. If there is no edge then the value presented for the last pair of frames is reused. The six bit value represents a difference in phase between the waveform of the data signal received on the terminal 4 and the clock signals generated by the analogue delay locked loop 2.

Referring again to FIG. 1, the first digital filter 8 takes the series of 6 bit values presented by the phase detector 7 and subjects them to low-pass filtering. Since the components of first digital filter 8 are shared on a time division basis with those of the second filter 13, the details of both filters are described together below with reference to FIG. 10b.

Figure 7:
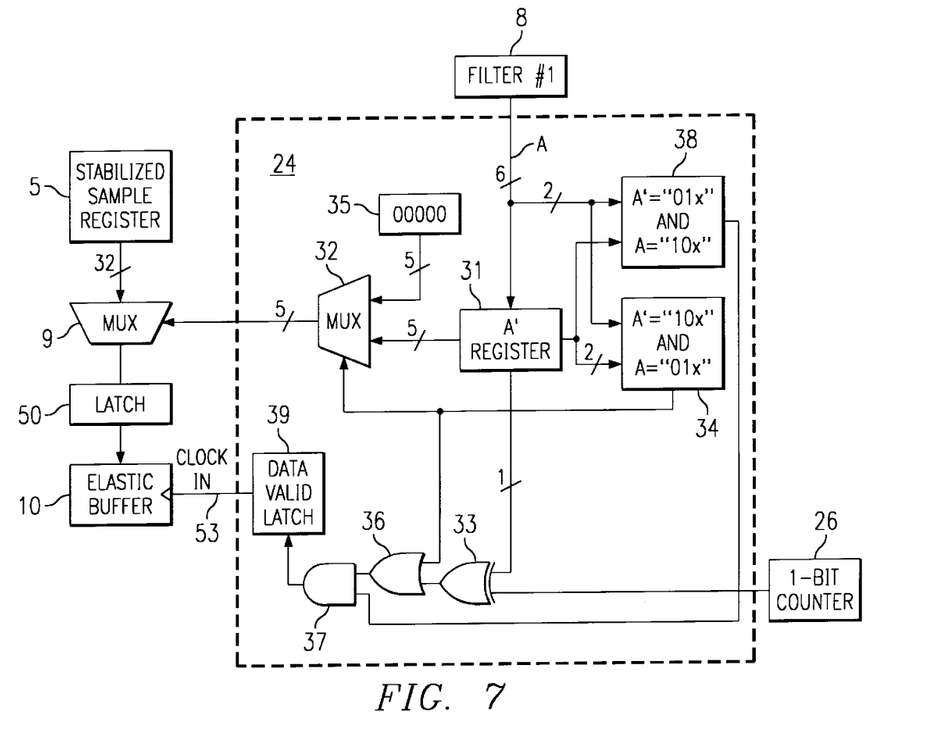
FIG. 7 is a block diagram of a frame selector.

FIG. 7 shows the details of the frame selector 24. The frame selector 24 takes as an input the filtered six bit edge position values from the first digital filter 8. Those six bit values enter the phase detector on a conductor A marked in FIG. 7. A new six bit value is available on A when the first of each pair of frames becomes available in the stabilised data register 5 and is latched at that time into a register 31 so that it is available when the second, as well as the first, frame of the pair is available. The value stored in the register 31 will be referred to as A'.

The frame selector 24 operates in most cases as follows. The five bits of lowest significance of the six bit value A' are forwarded to the select input of the multiplexer 9 via a multiplexer 32. Those five bits determine the position of a selected sample within a frame. The sample emerging from the multiplexer 9 is latched by a latch 80, connected in series between the multiplexer and the elastic buffer 10, found desirable due to propagation delays in the multiplexer, which may otherwise result in the sample not being available for latching into the elastic buffer at a time defined by the system clock. The frame of a pair in which the selected sample falls is determined by an XOR gate 33 which produces a pulse when the value of the one-bit counter 26, which numbers the frames alternately, is not equal to the most significant bit of A'. The XOR gate 33 ensures that the selected sample falls in the other frame of a pair from that indicated by the edge position value and so carries out the selection method described with reference to FIG. 5. The pulse propagates via an OR gate 36 and an AND gate 37, to a "data valid" latch 39. The "data valid" latch provides the input clock for the elastic buffer 10 and causes the elastic buffer to latch the selected sample when it is available in the latch 80.

Filtered edge position values are used because it is desired to select the samples as soon as possible. If the edge position value calculated for a pair of frames by the phase detector 7 were to be used to select the sample from that pair of frames then it would be necessary to store the pair until that edge position value had been calculated.

Figure 8:
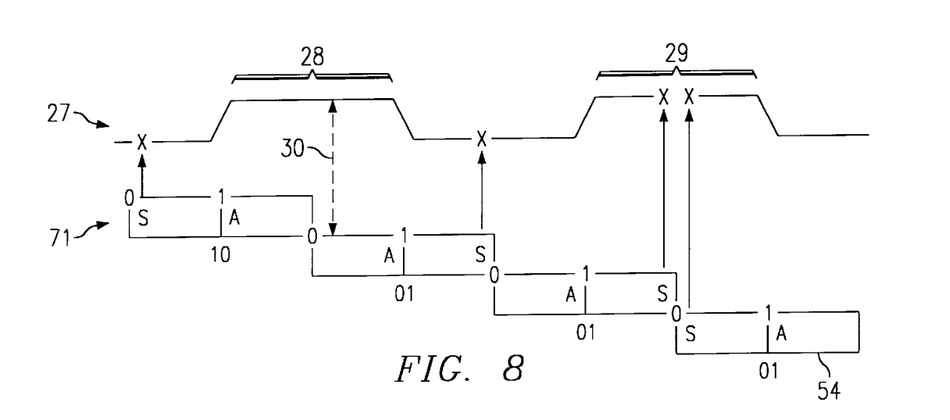
FIG. 8 illustrates errors in the selection of samples.

The frame selector 24 deals with two errors in the selection of the samples that could otherwise occur from time to time. FIG. 8 illustrates those errors. The Figure shows a data waveform 27 representing a series of "0"s. Below at 71 is a series of paired frames. At the top left of each frame is the value of the one-bit counter 26 for that frame. Marked under each pair of frames are the two most significant bits of the six bit value A used to select the sample for that pair of frames. In the Figure, the positions corresponding to those six bit values are marked by an A. The operation of the frame selector described above results in the selection of the samples marked S.

A first type of error occurs when the two bits of most significance of the edge position value change from "10" to "01" as occurs between the first two pairs of frames in FIG. 8. When that happens half 28 of a symbol remains unsampled.

A second type of error occurs when the two bits of most significance of the edge position value change from "01" to "10" as occurs between the third and fourth pairs of frames in FIG. 8. When that happens half 29 of a symbol is sampled twice.

The first type of error is avoided by forcing an extra sample to be selected. This extra sample is the earliest, position "00000", in the first frame of the pair for which the two bits of most significance of the edge position value are "01". The extra sample is marked in FIG. 8 at 30. The second type of error is avoided by suppressing the selection of the second of the two samples.

The frame selector 24 performs those corrections as follows. Towards the end of a pair of frames the value A for the next pair becomes available. At that time the first error is looked for by a comparator 34 (see FIG. 7) which checks whether the two bits of greatest significance of the stored value A' are "10" and those two bits of the new value A are "01". If so the comparator produces a positive pulse. That results in multiplexer 32 presenting the contents "00000" of a register 35 to the select input of the multiplexer 9. The positive pulse from the comparator also propagates via the OR gate 36 and the AND gate 37 to the "data valid" latch 39 which then causes the elastic buffer 10 to latch, from the stabilised sample register, the earliest sample present in the first frame of the next pair, as represented at 30 in FIG. 8.

A comparator 38 (see FIG. 7), which has a normally high output, checks whether the two bits of greatest significance of the stored value A' are "01" and those two bits of the new value A are "10". If so it produces a negative pulse to AND gate 37. That stops the pulse generated by the XOR gate 33 from propagating to the elastic buffer 10 and so prevents the sample in the first frame of the next pair from being selected. Such a suppressed sample is marked at 54 in FIG. 8.

Referring again to FIG. 1, the low pass filtered six bit edge position values formed by the first digital filter 8 are low-pass filtered again by the second digital filter 13. The cut off frequency of the second digital filter is lower than that of the first. Like the first digital filter the second provides one edge position value for each pair of frames. As each sample is produced it is latched and is applied to the select input of the multiplexer 12. In response the multiplexer 12 propagates one of the thirty two 64 MHz clock signals. The series of edge position values produced by the second digital filter 13, which represent the phase difference between the system clock and the data signal present at the terminal 4, is strongly filtered and so varies only slowly. The signal emerging from the multiplexer is therefore a 64 MHz clock signal having a slowly varying phase. Since the selected samples are entered into the elastic buffer at a rate of $32 \times 10^6$ per second, the 64 MHz clock signal emerging from the multiplexer 12 is divided by two by the divide-by-two counter 55 before it is applied as the output clock of the elastic buffer. The waveform produced at the data output of the elastic buffer is the waveform present at terminal 4 except that it is reformed with the jitter greatly reduced and the symbols reshaped. The waveform is now therefore suitable for retransmission, as is required in token ring networks.

The samples output from the elastic buffer can be processed digitally to recover the data represented by the differential Manchester coded symbols of the waveform received at terminal 4. The clock signal applied to the elastic buffer 10 in order to produce its output samples is synchronised with those samples and so can be used to actuate the circuits used for such further processing.

Figure 9A:
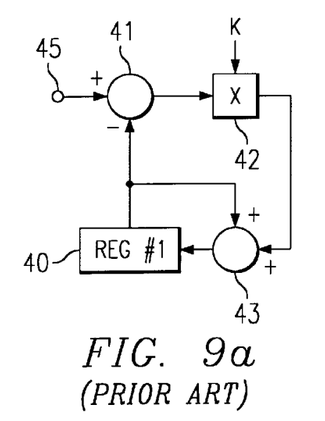
FIGS. 9a and 9b are block diagrams of two known digital filter circuits.
Figure 9B:
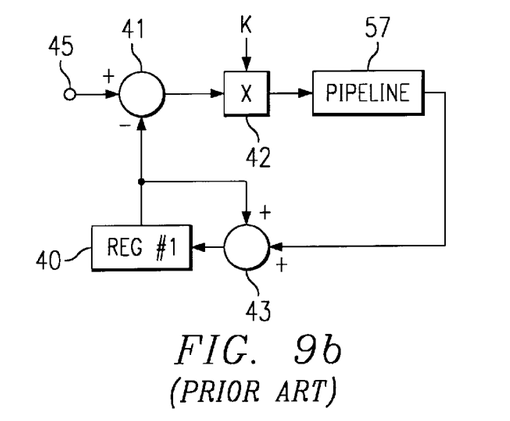

FIGS. 9a and 9b are block diagrams of two known digital filter circuits. The signal that it is intended that these circuits should filter is a digital signal representing the slowly changing difference in phase between two signals. For that reason such filter circuits are often called digital phase locked loops. The edge position values produced by the phase detector 7 of the circuit of FIG. 1 form such a signal and the circuits of FIGS. 9a and 9b could in principle be used for the first and second digital filters 8 and 13 of the circuit of FIG. 1. They could, of course, be used in other unrelated circuits.

FIG. 9a shows the simpler circuit. The circuit comprises a first register 40, a subtractor 41, a scaler 42 and an adder 43. The subtractor 41 subtracts the value held in the first register 40 from a phase sample present at an input 45. The result is multiplied by a factor k, usually of magnitude 1 or less. The result of the scaling is then added, by adder 43, to the value in the first register 40. The first register 40 is clocked and the result of the addition is stored back in the first register. The filtered output samples of the circuit are those occurring in this register 40.

FIG. 9b shows a similar circuit to that of FIG. 9a except that it has an additional clocked register, termed a pipeline register 57, connected between the multiplier 42 and the adder 43. This additional register allows the circuit to be clocked at higher rates than would be possible with the circuit of FIG. 9a where the propagation delay through the subtractor 41, the scaler 42, and the adder 43 would result in the output of the adder 43 not being ready when the first register 40 latches. The pipeline register 57 does, however, result in the transfer function of the circuit having an extra pole which results in the circuit oscillating under certain conditions.

Figure 10A:
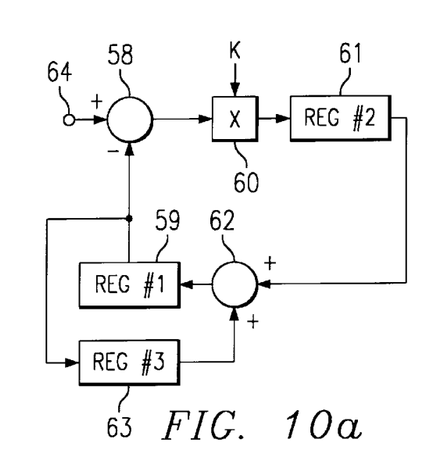
FIGS. 10a and 10b are block diagrams of two digital filter circuits according to the present invention.

FIG. 10a shows a digital filter circuit according to the present invention. The circuit comprises a subtractor 58 connected to subtract a value held in a first clocked register 59 from a sample input to the circuit at a terminal 64, a scaler 60 connected to multiply the output of the subtractor 58 by a factor k, a second clocked register 61 connected to latch the output of the scaler 60, and an adder 62 connected to add the value in the second clocked register 61 to the value in a third clocked register 63. The third clocked register 63 is connected to latch the value held in the first register 59. The first register 59 is connected to latch the output of the adder 62.

The output of the circuit is the series of values held in the first register 59. The values held in each of the registers are in two's complement notation, and the adder 62, the subtractor 58 and the scaler 60 manipulate the values accordingly. The factor k, which is usually 1 or less, determines the cut-off frequency of the low-pass characteristic of the circuit. A small value of k results in a low cut-off frequency and a slow locking on to the input signal after an initial condition or a rapid change in the input signal; a larger value of k results in a higher cut-off frequency but rapid locking on to the input signal. The multiplication performed by the scaler 60 is achieved by reducing the significance of the bits in the output of subtractor 58 before they are applied to the second register 61. That is achieved connecting more significant outputs of the subtractor to less significant inputs of the second register 61. The output representing the sign bit, the most significant bit, is connected to the n+1 inputs of greatest significance of the second register, where n is the number of bits by which the significance of the outputs of the subtractor are reduced. Factors of k which are not the reciprocal of an integral power of two would, of course, require the use of more complicated scaling techniques.

The second register 61 could alternatively be placed between the subtractor 58 and the scaler 60 and that would not affect the result produced by the circuit.

The inclusion of the third register 63 removes the extra pole in the transfer function from which the circuit of FIG. 9b suffers. It also results in the property that if the time steps according to which the circuit is operated are numbered, then even numbered values in the first register are only dependent on the earlier even numbered samples input to the circuit. Similarly odd numbered first register values are only dependent on earlier odd numbered input samples. The property is exploited in the circuit of FIG. 10b.

Figure 10B:
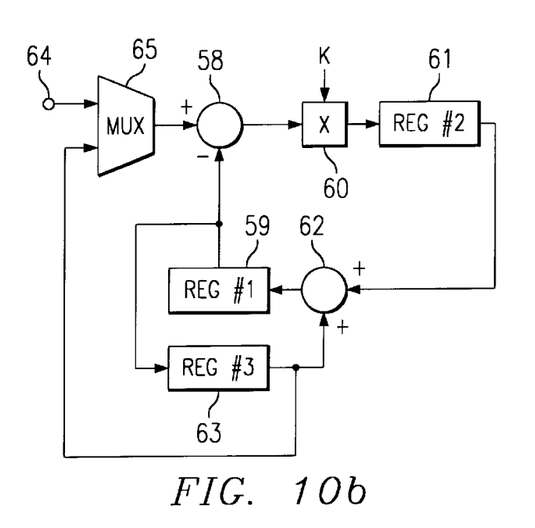

The digital filter circuit of FIG. 10b is similar to the circuit of FIG. 10a. It has, however, a multiplexer 65 connected to select as the positive input of the subtractor 58 either the sample at the input 64 of the circuit or the value in the third register 63. The multiplexer is so arranged that in use it selects alternately one sample from the input 64 and one sample from the third register 63. The result is a structure that is in effect two digital filter circuits which, in operation, share their components in a time division manner. The samples of the output signals of the two filters appear alternately in the first register 59. One of those signals is a filtered version of the signal input to the circuit and the other is that filtered signal filtered a second time.

The two filters may be given different k factors if the scaler 60 is made so responsive to the clock signal that operates the circuit that it scales one set of alternate samples by one of two different factors and the other set by the other factor.

It is the circuit of FIG. 10b that is used to provide the two digital filters 8, 13 used in the circuit of FIG. 1. The circuit is arranged to have a factor of k equal to ¼ for the first digital filter 8 and a factor of ¹/₁₆ for the second 13. That results in rapid following by the first digital filter 8 of the values output by the phase detector 7 which reduces the risk of large jitter causing errors in the selection of samples and in the second digital filter 13 having a low-cut off frequency in its low-pass characteristic which results in the reconstructed data waveform output from the elastic buffer 10 having very low jitter.

The filter circuit used in the circuit of FIG. 1 has ten bit registers, six bits equal in significance to those of the six bit values output by the phase detector and four fractional bits. The fractional bits ensure at accuracy is not lost when the values are scaled by the scaler 60. The circuit is clocked at a rate of 64 MHz the system clock signal 6 and so provides one output value of the first digital filter 8 for each pair of sample frames.

We claim:

1. A method of receiving an input digital data signal representing a sequence of values, comprising the steps of:

taking samples of the waveform of the data signal a plurality of times during each of the values, storing in a known order in locations at a sequence of addresses in a memory a plurality of the samples as they are received, deriving a digital phase signal representing the difference in phase between the input data signal and a reference signal by detecting and encoding the locations of the stored samples of the data signal that represent edges, wherein the detection of the position of an edge comprises combining pairs of the stored samples to give a result for each so combined pair dependent on whether the samples of that pair are the same or different, decoding the digital phase signal and accessing the location at the address of the memory represented by the digital phase signal so as to select samples remote from edges in the waveform of the input data signal, and wherein the stored samples are made available in parallel sets, and the detection of position of an edge comprises selecting one of the pairs of a set that has samples that differ.

2. A method according to claim 1, wherein the digital phase signal is derived from the samples of the data signal.

3. A method according to claim 2, wherein the digital phase signal is derived from the stored samples.

4. A method according to claim 1, further comprising the step of filtering the digital phase signal with a low pass digital filter before being used in the selection of the samples by comparing a current position of an edge with a stored filtered position of an edge, and modifying the stored filtered position of an edge in response to a difference between the current position of an edge and the stored filtered position of an edge, such that the stored filtered position of an edge is used to select samples.

5. A method according to claim 1, wherein the samples are taken by a plurality of sampling means, the sampling means of the plurality being operated in sequence.

6. A method according to claim 1, wherein the stored samples are made available in parallel sets, and the encoded values of edge position also include indications of the set of samples in which the detected edges occurred.

7. A method according to claim 6, wherein the sets are grouped into pairs and the indication indicates in which of a pair the detected edge position falls.

8. A method according to claim 7, wherein the indication is used to select a sample at the same position in the other of the two consecutive sets of samples from the one in which the edge occurred.

9. A method according to claim 1, wherein a set of parallel samples includes one or more of the samples of the previous set.

10. A method according to claim 1, further comprising:

storing the selected samples in a first-in-first-out memory, providing a plurality of clock signals of the same frequency and differing phases, selecting, from time to time, in response to the digital phase signal or another digital phase signal derived in a similar manner, one of the plurality of clock signals, and reading each selected sample from the first-in-first-out memory at times determined by the selected clock signal.

11. A method according to claim 10, further comprising the steps of:

filtering the digital phase signal with a low pass digital filter before being used to select samples by comparing a current position of an edge with a stored filtered position of an edge, and modifying the stored filtered position of an edge in response to a difference between the current position of an edge and the stored filtered position of an edge, such that the stored filtered position of an edge is used to select samples, and filtering the filtered digital phase signal again before being used to select the clock signal by comparing a current filtered position of an edge with a stored filtered position of an edge, and modifying the stored filtered position of an edge in response to a difference between the current filtered position of an edge and the stored filtered position of an edge.

12. A method according to claim 11, wherein the same circuitry is used on a time division basis to perform the two digital filtering operations.

13. Apparatus for receiving an input digital data signal representing a sequence of values, comprising:

means for taking samples of the waveform of the data signal a plurality of times during each of the values, a first memory for storing in a known order in locations at a sequence of addresses a plurality of the samples as they are received, a phase detector for deriving a digital phase signal representing the difference in phase between the input data signal and a reference signal, and means for decoding the digital phase signal and accessing the location at the address of the memory represented by the decoded digital phase signal so as to select samples remote from edges in the waveform of the input data signal, and wherein the phase detector comprises means for detecting and encoding the locations of the samples in the memory that represent edges, wherein the means for detecting of the positions of edges comprises a plurality of combining means each for combining a pair of the samples in the memory to give a result dependent on whether the samples of that pair are the same or different, and wherein the phase detector further comprises encoding means responsive to the outputs of the combining means to encode as the digital phase signal the position of one of the combining means indicating a difference between the samples of its pair.

14. Apparatus according to claim 13, comprising a digital filter connected to filter the digital phase signal before it is used in the selection of the samples.

15. Apparatus according to claim 13, wherein the means for sampling comprises a plurality of sampling circuits, the sampling circuits of the plurality being connected to operate in sequence each to sample the waveform of the input digital data signal.

16. Apparatus according to claim 13, wherein the encoding means is responsive to a counter to encode in the digital phase signal the value in the counter when the phase detector detects an edge.

17. Apparatus according to claim 16, the means for decoding the digital phase signal and accessing the selected samples comprises a selector responsive to the encoded value of the counter to cause the memory to be read when it contains the selected sample.

18. Apparatus according to claim 13, wherein the memory has a location to latch a sample already in another location of the memory.

19. Apparatus according to claim 13, further comprising:

a first-in-first-out memory connected to latch the selected samples from the first memory, means for providing a plurality of clock signals of the same frequency and differing phases, and a multiplexer responsive to the digital phase signal or another digital phase signal derived in a similar manner, to transmit a selected one of the plurality of clock signals, the first-in-first-out memory being responsive to the transmitted clock signal to read out the selected samples.

20. Apparatus according to claim 19, comprising a digital filter connected to filter the phase signal applied to the multiplexer, wherein the digital filter is operable to compare a current position of an edge with a stored filtered position of an edge, and to modify the stored filtered position of an edge in response to a difference between the current position of an edge and the stored filtered position of an edge.

21. Apparatus according to claim 19, comprising a clock dividing counter connected to divide the transmitted clock signal before it is applied to the first-in-first-out memory.

22. Apparatus according to claim 19, wherein the means for providing a plurality of clock signals comprises a master oscillator and an analogue delay locked loop comprising a plurality of delay stages connected in a loop synchronised to it.

23. Apparatus according to claim 13, wherein the means for decoding the digital phase signal and accessing the selected samples comprises a multiplexer responsive to the digital phase signal to transmit the value in the selected address of the first memory.

24. A circuit for performing a method of selecting in general a sample from each interval of the waveform of a digital data signal having edges that may occur at positions at the ends of the intervals, by sampling the waveform, dividing the samples into frames equal in length to half the length of the interval and selecting from each pair of frames a sample at the same position in the other frame of the pair from that indicated by a value derived from the position of detected edges, the circuit comprising means for correcting an error of selecting no sample from an interval, comprising:

means for indicating whether the value for the current pair of frames indicates a position in the later half of the first frame of that pair and the value for the previous pair of frames indicates a position in the earlier half of the second frame of that pair, and means responsive to that indication for causing a sample at the early end of the first frame of the current pair to be selected.

25. A circuit for performing a method of selecting in general a sample from each interval of the waveform of a digital data signal having edges that may occur at positions at the ends of the intervals, by sampling the waveform, dividing the samples into frames equal in length to half the length of the interval and selecting from each pair of frames a sample at the same position in the other frame of the pair from that indicated by a value derived from the position of detected edges, the circuit comprising means for correcting an error of selecting two samples from an interval, comprising:

means for indicating whether the value for the current pair of frames indicates a position in the earlier half of the second frame of that pair and the value for the previous pair of frames indicates a position in the later half of the first frame of that pair, and means responsive to that indication for preventing the selection of a sample at the early end of the first frame of the current pair that would otherwise have been selected.

26. A method for receiving an input data signal representing a sequence of data having values, wherein each value has a width and at least one associated transition edge, comprising the steps of:

taking samples of the waveform of the data signal a plurality of times during each of the values, grouping the samples in sets in an ordered manner, such that a pair of consecutive sets represent a time approximately equal to the width of a datum;

determining if a first transition edge is included within either set of samples of a first pair of consecutive sets by detecting that the samples in a first set of the first pair of consecutive sets represent different logic states;

encoding a relative position of the first transition edge within the first set of samples when it is determined that a first transition edge is included within the first pair of consecutive sets;

selecting a first sample from the other set of the first pair of consecutive sets that is in approximately the same relative position as the first transition edge;

using the first sample to represent a value for a first datum of the data signal; and repeating the steps of determining, encoding, selecting and using with each consecutive pair of sets of samples to form a sequence of values which correspond to the data signal.

* * * * *